United States Patent
Kwon et al.

(10) Patent No.: US 8,483,177 B2
(45) Date of Patent: Jul. 9, 2013

(54) MOBILE TERMINAL AND METHOD OF PERFORMING HANDOVER

(75) Inventors: Hye Yeon Kwon, Daejeon (KR); You Sun Hwang, Seoul (KR); Ae Soon Park, Daejeon (KR)

(73) Assignees: Electronics and Telecommunications Research Institute, Daejon (KR); KT Corporation, Kyeongki-do (KR)

( * ) Notice: Subject to any disclaimer, the term of this patent is extended or adjusted under 35 U.S.C. 154(b) by 380 days.

(21) Appl. No.: 12/809,322

(22) PCT Filed: Jul. 29, 2008

(86) PCT No.: PCT/KR2008/004421
§ 371 (c)(1),
(2), (4) Date: Jun. 18, 2010

(87) PCT Pub. No.: WO2009/078534
PCT Pub. Date: Jun. 25, 2009

(65) Prior Publication Data
US 2011/0164588 A1    Jul. 7, 2011

(30) Foreign Application Priority Data
Dec. 18, 2007   (KR) .................. 10-2007-0133769

(51) Int. Cl.
*H04W 4/00* (2009.01)

(52) U.S. Cl.
USPC ........................................... 370/331

(58) Field of Classification Search
None
See application file for complete search history.

(56) References Cited

U.S. PATENT DOCUMENTS

| 2003/0185172 A1 | 10/2003 | Rue |
| 2008/0256220 A1* | 10/2008 | Bachmann et al. ............ 709/222 |
| 2009/0023448 A1* | 1/2009 | Attar et al. .................... 455/436 |
| 2010/0131663 A1* | 5/2010 | Lee et al. ...................... 709/228 |

FOREIGN PATENT DOCUMENTS

| EP | 1613108 A1 | 1/2006 |
| KR | 1020060098630 | 9/2006 |
| KR | 1020070005872 | 1/2007 |
| KR | 1020070087451 | 8/2007 |
| KR | 1020070103362 | 10/2007 |
| WO | 2006/022534 A1 | 3/2006 |

* cited by examiner

*Primary Examiner* — John Blanton
*Assistant Examiner* — Christopher Crutchfield
(74) *Attorney, Agent, or Firm* — Nelson Mullins Riley & Scarborough LLP; EuiHoon Lee, Esq.

(57) ABSTRACT

Enclosed are a mobile terminal and a method of performing handover. The mobile terminal is connected to a selected network among a plurality of networks sensed in accordance with the movement of the mobile terminal so that handover is performed between different networks and that a service used by the mobile terminal is continuously provided. Therefore, the convenience of a user is improved and network utility is improved.

6 Claims, 4 Drawing Sheets

MOBILE TERMINAL AND METHOD OF PERFORMING HANDOVER

TECHNICAL FIELD

The present invention relates to a mobile terminal and a method of performing handover, and more particularly, to a mobile terminal capable of performing handover among different networks in accordance with the movement of a mobile terminal so that a service that is being used can be continuously provided and a method of performing handover.

The present invention is derived from researches performed as a part of the IT growth dynamic force technology development of the Ministry of Information and Communication and the Institute for Information Technology Advancement [subject management number: 2005-S-404-33 and subject title: development of a 3G evolution terminal technology].

BACKGROUND ART

Recently, with remarkable development of the radio connection of a mobile terminal, interests in mutual connection and handover among different radio networks having different radio connection technologies are increasing.

In particular, in mutual connection between a mobile communication network and a wireless local area network (WLAN), the WLAN having narrow coverage is provided to overlap the densely populated area of a mobile communication network having wide coverage so that a user of the mobile terminal can use IP based multimedia services at a low price and that a mobile terminal network enterpriser can reduce network construction cost and communication load in the densely populated area and can disperse users. Therefore, interest in the mutual connection between the mobile communication network and the WLAN is increasing.

In such an environment, a mobile communication system having a completely different network connection method and a mobile terminal to which all kinds of WLAN systems can be connected are required. Furthermore, connection procedures, subscriber authentication technologies, charging technologies, mobility technologies, and quality of service (QoS) technologies that are required by the networks are to be accepted.

In addition, in the above-described mutual connection between the mobile communication network and the WLAN, there are many difficulties in connection setup procedures so that it is difficult to apply the connection procedures of the conventional WLAN to the mobile communication network and, reversely, to apply the connection procedures of the mobile communication network to the WLAN. Therefore, the handover of the mobile terminal among different networks is limited.

DISCLOSURE OF INVENTION

Technical Problem

In order to solve the above-described problems, it is an object of the present invention to provide a mobile terminal capable of performing handover among a plurality of radio networks having different connection procedures in accordance with the selection of a mobile terminal so that the mobile terminal can continuously use a server that is being used during the handover of the mobile terminal through connection among the plurality of radio networks and a method of performing handover.

Technical Solution

In order to achieve the object, a method of performing handover of a mobile terminal comprises, in a state where a mobile terminal is connected to a first radio network, when a second radio network having a different connection procedure from a connection procedure of the first radio network and connected to an evolved packet core (EPC) of the first radio network is sensed, selecting the second radio network and starting handover to the second radio network using a second radio network interface ID for the second radio network, generating an IP packet in accordance with the second radio network interface ID and performing an IP mobility procedure, being connected to the second radio network to perform an association procedure through subscriber authentication, to request the second radio network to update IP addresses, and to register the updated IP addresses, and receiving packet data through the second radio network using the updated IP addresses.

In addition, the method of performing the handover of the mobile terminal further comprises, in a state where the mobile terminal is connected to the second radio network, selecting the first radio network to correspond to a change in a signal magnitude of the second radio network before connection to the second radio network is canceled to start handover to the first radio network through a first radio network interface ID for the first radio network.

In addition, a mobile terminal comprises a first communication module connected to a first radio network, a second communication module connected to a second radio network having a different connection method from a connection method of the first radio network and connected to an EPC of the first radio network, a network selecting unit for selecting one of the first and second radio networks and starting handover from a currently connected network to the selected network using a network interface ID for the selected network, and an IP mobility managing unit for registering a new IP address received from the selected network to perform an IP mobility procedure and for allowing packet data to be received through the selected network.

Advantageous Effects

In the mobile terminal according to the present invention and the method of performing handover, the handover of the mobile terminal can be performed among different radio networks so that the mobile terminal can selectively use the radio networks and that a service used by the mobile terminal can be continuously provided. Therefore, convenience of users is improved and users connected to the radio networks can be dispersed so that it is possible to effectively manage the networks.

BEST MODE FOR CARRYING OUT THE INVENTION

Hereinafter, embodiments of the present invention will be described with reference to the accompanying drawings.

Figure 1:
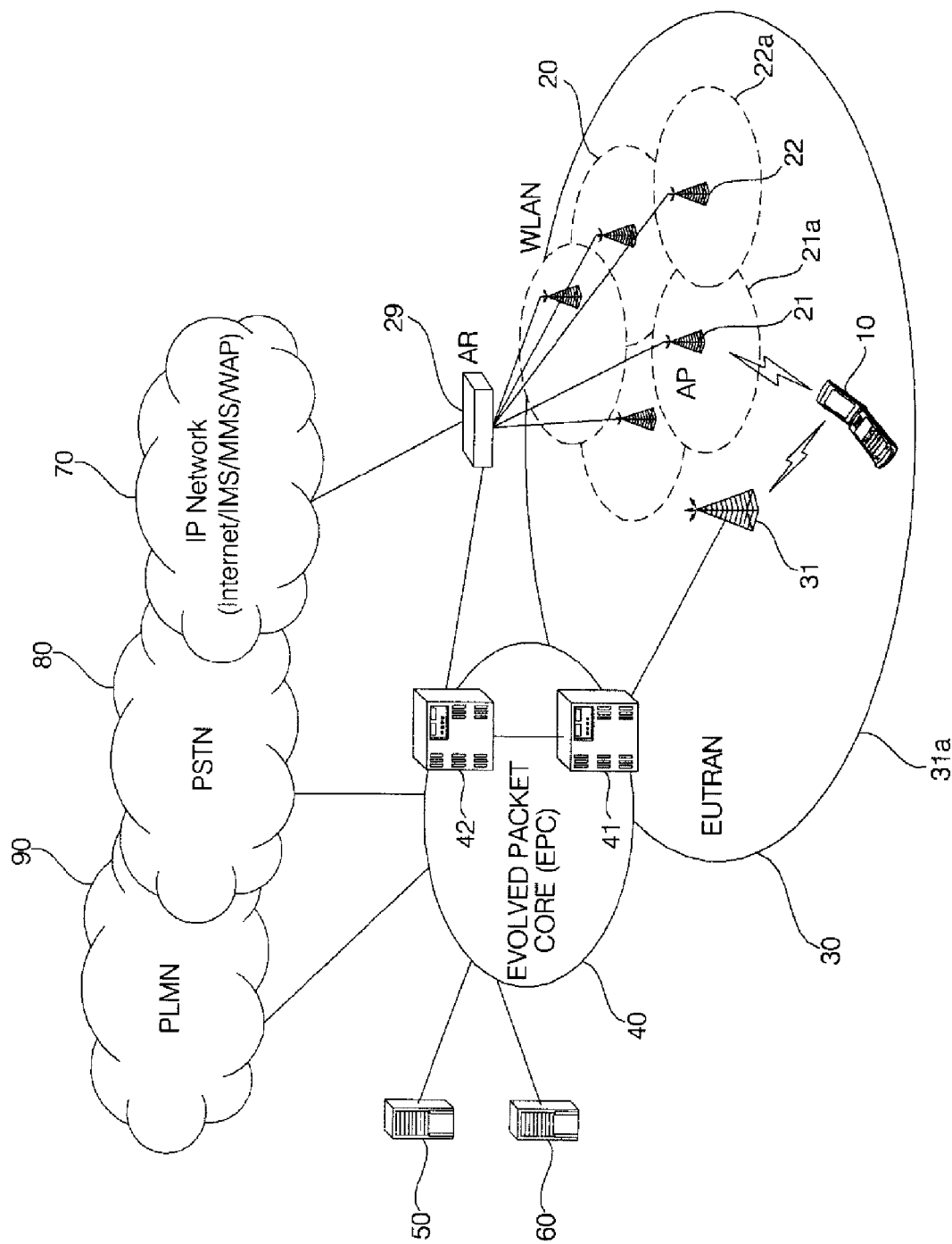
FIG. 1 illustrates the structures of radio networks according to an embodiment of the present invention.

FIG. 1 illustrates the structures of radio networks according to an embodiment of the present invention.

Referring to FIG. 1, a mobile terminal UE 10 is connected to a mobile communication network including an evolved universal mobile telecommunications network terrestrial radio access network (EUTRAN) 30 consisting of a plurality of evolved nodes eNodeB 31 and to a wireless local area network (WLAN) 20 consisting of a plurality of access points (AP) 21 and 22 and a router (AR) 29.

Hereinafter, in the mobile communication network and the WLAN according to the present invention, only partial components will be described among common network components for convenience sake and description of the other components will be omitted. At this time, terms for the components can change, however, the meanings are the same.

The WLAN 20 is connected to an IP network 70 through the router AR 29 and can be connected to an evolved packet core (EPC) 40. At this time, the WLAN 20 provides the handover of the mobile terminal UE 10 through mutual connection to the mobile communication network including the EPC 40 and can be connected to a PSTN 80 or a PLMN 90.

At this time, the WLAN 20 has predetermined coverage 21a and 22b in the APs 21 and 22 narrower than the coverage of one evolved node 31 of the EUTRAN 30.

The mobile communication network includes the EPC 40 connected to the EUTRAN 30 to request switching and routing and to connect data to an external network, that is, to connect the mobile terminal UE 10 to the IP network 70, the PSTN 80, or the PLMN 90. The EPC 40 includes a mobility management entity (MME) 41 and a system architecture evolution gateway (SAE GW) 42 and is connected to an authentication authorization account (AAA) 50 and an IP mobility management server 60.

At this time, the AAA 50 is a common authentication server for authenticating subscribers and the IP mobility management server 60 register and manage IP addresses for a change in the IP addresses of the mobile terminal UE 10.

The evolved nodes eNodeB 31 included in the EUTRAN 30 manage radio resources in units of cells to constitute and communicate with the mobile terminal UE 10 and radio channels that exist in the corresponding cells and to assign the radio resources to and release the radio resources from the mobile terminal UE 10. The evolved nodes eNodeB 31 receive upward link signals received from the mobile terminal UE 10 in a physical layer level to transmit the upward link signals to the EPC 40 and transmit downward link signals from the EPC 40 to the mobile terminal UE 10 to function as APs for connecting the mobile terminal UE 10 to the EUTRAN 30.

The MME 41 of the EPC 40 is connected to the evolved node eNodeB 31 of the EUTRAN 30 to control the mobility and the bearer of the mobile terminal UE 10 and to manage connection information. The SAE GW 42 functions as a gateway to be connected to the Internet or an external packet network, assigns a tunnel in accordance with the use of a service of the mobile terminal UE 10, manages the generated tunnel, and assigns IPs to the mobile terminal UE 10. In addition, the SAE GW 42 filters a packet received from the IP network 70 and transmits the packet to the evolved node eNodeB 31 through the tunnel assigned to the mobile terminal UE 10 to transmit data to the mobile terminal UE 10.

The mobile terminal UE 10 connected to the mobile communication network or the WLAN can use IP based multimedia services such as voice, an image, position confirmation, and an instant message service. One of a mobile telephone, a notebook, a personal digital assistant (PDA), and an ultra mobile PC (UMPC) can be used as the mobile terminal UE 10. Any terminal that satisfies the requirements of the performances of the mobile communication network and the WLAN can be used as the mobile terminal UE 10. At this time, the mobile terminal UE 10 includes communication units to be connected to the mobile communication network and the WLAN.

The mobile terminal UE 10 is connected to the evolved nodes 31 in the EUTRAN 30 at the moment when power is turned on to be registered in the mobile communication network and basic IP connection is set at the moment when the mobile terminal UE 10 is registered in the mobile communication network.

At this time, when the mobile terminal UE 10 enters the coverage of the WLAN while the IP based services of the IP network are being used, the mobile terminal UE 10 senses the WLAN 20 to select one network. When one of the mobile communication network and the WLAN is selected, the mobile terminal UE 10 performs handover to the corresponding network.

At this time, the mobile terminal UE 10 performs a WLAN connection procedure and a subscriber authentication procedure using a network interface ID in accordance with a predetermined mobility management procedure, performs IP address setup and registration procedures, and performs handover to the WLAN 20.

In addition, the mobile terminal UE 10 can perform handover to the mobile communication network while the IP based services are being used through the WLAN.

When the mobile terminal UE 10 deviates from the coverage of the connected WLAN 20 while a service is being provided through the WLAN 20, it is requested to re-setup a radio access bearer using the network interface ID of a mobile communication module and a predetermined procedure is performed so that the mobile terminal UE 10 that is activated is transited from the mobile communication network. Then, the IP address setup and registration procedures are completed and the handover to the mobile communication network is completed.

At this time, a service is continuously provided to the mobile terminal UE 10 through the mutual connection of the mobile communication network and the WLAN 20.

Figure 2:
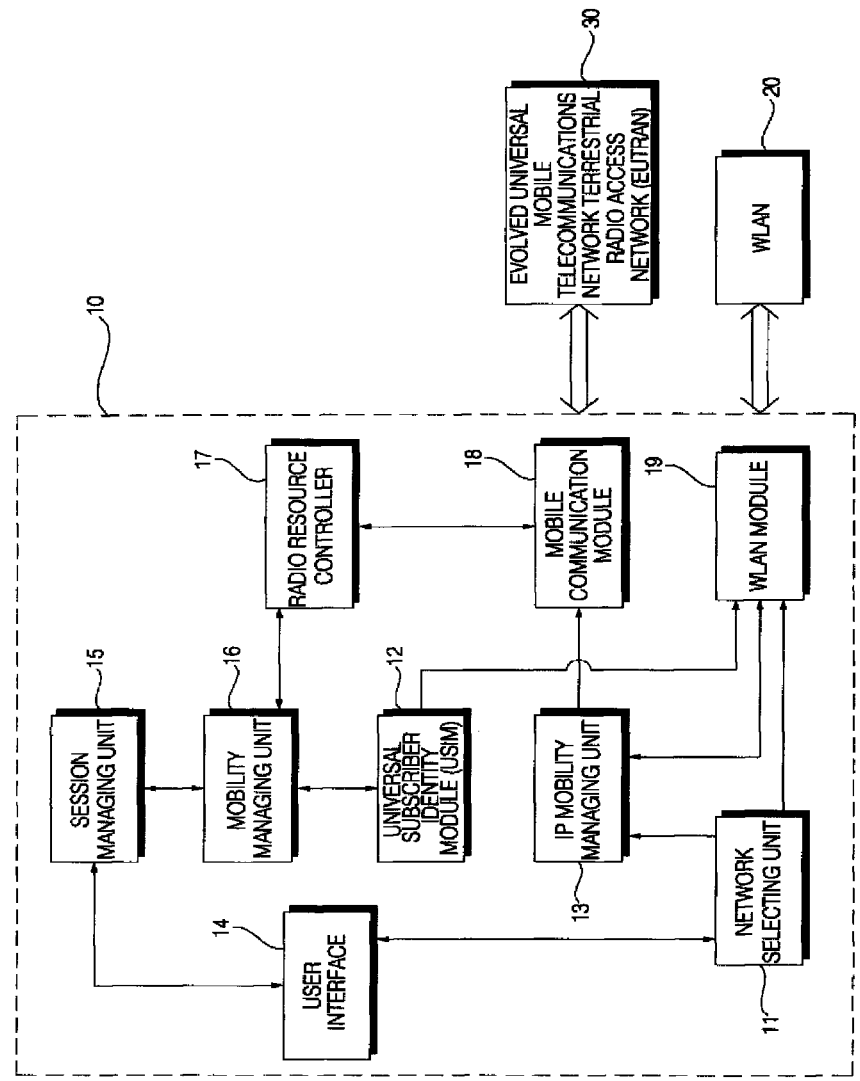
FIG. 2 is a block diagram illustrating the structure of a mobile terminal according to an embodiment of the present invention.

FIG. 2 is a block diagram illustrating the structure of a mobile terminal according to an embodiment of the present invention.

The mobile terminal UE 10 connected to the WLAN and the mobile communication network has the following structure.

Referring FIG. 2, the mobile terminal UE 10 includes a plurality of communication modules to be connected to the WLAN 20. At this time, the mobile terminal UE 10 includes a WLAN module 19 and a mobile communication module 18 to be connected to the mobile communication network.

In addition, the mobile terminal UE 10 includes a network selecting unit 11, a universal subscriber identity module (USIM) 12, an IP mobility managing unit 13, a user interface 14, a session managing unit 15, a packet mobility managing unit 16, and a radio resource controller 17.

At this time, the network selecting unit 11, the USIM 12, and the IP mobility managing unit 13 are connected to both of the mobile communication network and the WLAN and the user interface 14, the session managing unit 15, the packet mobility managing unit 16, and the radio resource controller 17 are connected to the mobile communication network.

The network selector 11 is a mechanism for selecting one of the EUTRAN 30 and the WLAN 20, to which a common link layer triggering algorithm for triggering handover is applied. At this time, the network selecting unit 11 selects one of the plurality of networks in accordance with predetermined data or the policy of a network manager. If necessary, the network selecting unit 11 can select one network based on the data input through the user interface provided in the mobile terminal UE 10.

The USIM 12 is connected to the packet mobility managing unit 16 to store mobile communication subscriber information and authentication information and code key data that are required by the mobile terminal UE 10 and to perform a subscriber authentication algorithm. At this time, a smart card mounted in the mobile terminal UE 10 can be used as the USIM 12.

When the mobile terminal UE 10 moves to a different network, the IP address used by the mobile terminal UE 10 cannot be used anymore so that IP based application programs cannot be used. Therefore, the IP mobility managing unit 13 allows a service to be continuously provided although the IP address is changed using a mobile IP (MIP) protocol.

The user interface 14 included in the mobile terminal UE 10 sets a parameter and processes a menu to process a call on the mobile communication network and performs interface with a lower protocol and interface with an upper application service program.

The session managing unit 15 generates, corrects, and deletes a session in accordance with the activation or deactivation of an upper application service using a session management protocol that is the sub-protocol of a network layer protocol on the mobile communication network. In addition, the session managing unit 15 receives information items on IP address management, quality of service (QoS) corresponding to a service, and an upward link IP packet filter from the network to transmit the received information items.

The packet mobility managing unit 16 registers the initial stage and position of the network for a packet service, sets subscriber authentication and encryption, and processes upper layer data, a control message, and a paging response from the mobile terminal UE 10 to the mobile communication network to generate and manage connection between the mobile terminal UE 10 and the mobile communication network on the mobile communication network using a packet exclusive mobility management protocol positioned in the lower layer of the session management protocol as the sub-protocol of the network layer protocol.

The radio resource controller 17 receives system information periodically broadcast by the mobile communication network, sets, corrects, and cancels the protocol entities of a lower layer, and transmits an upper layer message between the mobile terminal UE 10 and the mobile communication network on the mobile communication network using a radio resource control protocol positioned in the lower layer of the mobility management protocol as the sub-protocol of the network layer protocol.

The WLAN module 19 senses the AP 21 of the WLAN 20 and is connected to the AP 21 in accordance with the control command of the network selecting unit 11 to provide a WLAN service to the mobile terminal UE 10.

At the moment when power is turned on to drive the mobile terminal UE 10, the user interface and the packet mobility managing unit 16 request the radio resource controller 17 to set radio connection to one evolved node 31 of the EUTRAN 30 so that the set radio connection is registered in the EPC 40 through the evolved node 31 connected by the mobility management protocol of the packet mobility managing unit 16.

At this time, since default IP connection is set in an initial registration procedure in accordance with the setup and registration of connection between the EUTRAN 30 and the EPC 40, the mobile terminal UE 10 is activated so that IP packet data are transmitted and received without setting an additional session to the mobile communication network. In addition, when there is no data transmission between the mobile communication networks, the mobile terminal UE 10 is transited to be in an idle state. When it is again requested by the mobile communication network to transmit upward data or perform paging, the mobile terminal UE 10 is transited to be in an active state.

As described above, when the mobile terminal UE 10 enters the coverage of the WLAN 20 while being connected to the mobile communication network, the network selecting unit 11 requests the WLAN 20 to be connected thereto or continuously stays in the EUTRAN 30 in accordance with the policy or setup of the network manager. The handover to a different network, which is performed by the network selecting unit 11, can vary in accordance with setup.

The above-described operations according to an embodiment of the present invention will be described as follows.

Figure 3:
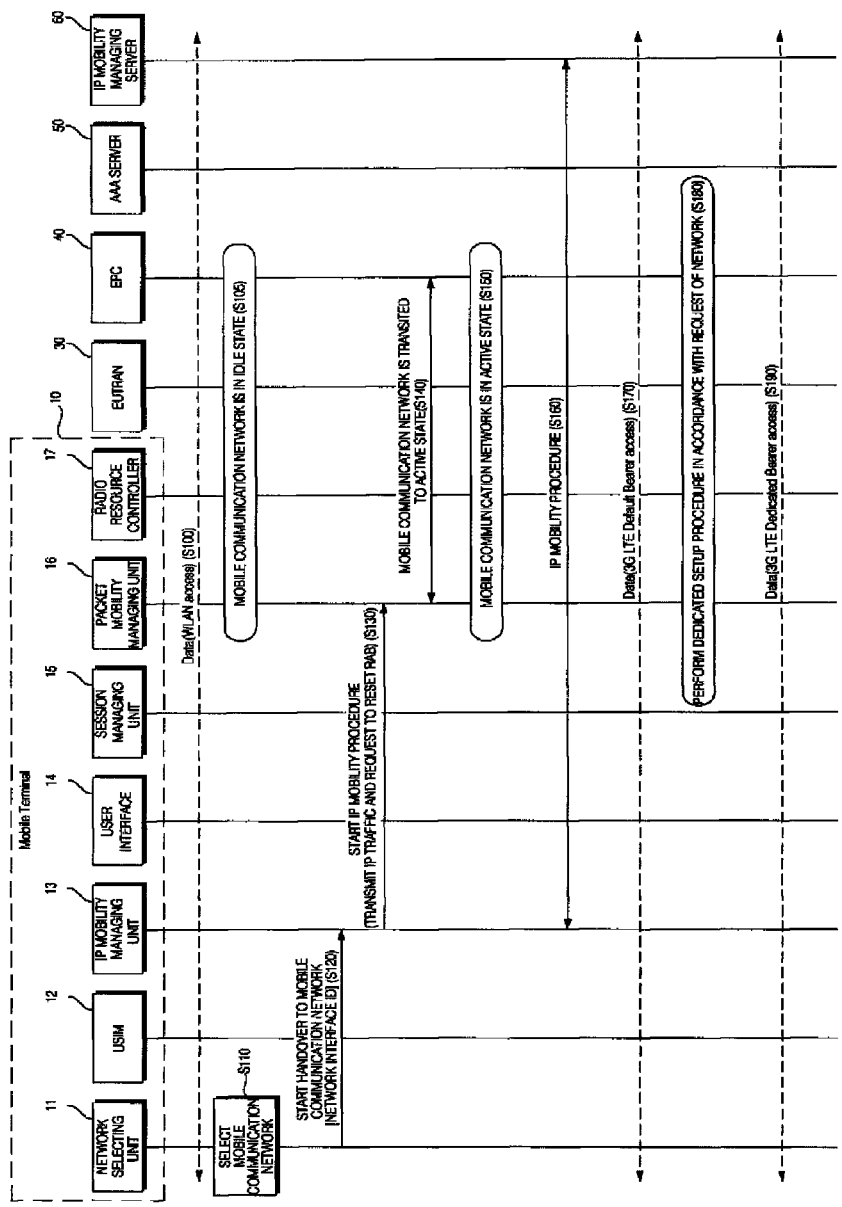
FIG. 3 illustrates the operations of a method of performing handover of the mobile terminal according to an embodiment of the present invention from a wireless local area network (WLAN) to a mobile communication network.

FIG. 3 illustrates the operations of a method of performing handover of the mobile terminal according to an embodiment of the present invention from a wireless local area network (WLAN) to a mobile communication network.

Referring to FIG. 3, when the mobile terminal UE 10 deviates the coverage of the WLAN 20 in a state where the mobile terminal UE 10 uses a packet service through the WLAN 20 (S100), the network selecting unit 11 of the mobile terminal UE 10 determines that the mobile terminal UE 10 deviates from the coverage of the WLAN 20 in accordance with the magnitude of the received signal of the WLAN module 19 and selects one of the plurality of evolved nodes 31 of the EUTRAN 30 sensed by the mobile communication module 18 to determine the handover to the mobile communication network (S110).

At this time, when power is driven, the mobile terminal UE 10 is previously registered in the mobile communication network and is connected to the WLAN 20 so that, when the packet service is used, connection to the mobile communication network is in the idle state (S105).

The network selecting unit 11 transmits the network interface ID of the corresponding mobile communication network to the IP mobility managing unit 13 so that the handover is started (S120).

The IP mobility managing unit 13 generates an IP packet in order to perform an IP mobility procedure. At this time, since the generated IP packet is filtered by a packet data convergence protocol (PDCP) in charge of the transmission of the IP packet data and the compression of a header and is mapped to a logical radio access bearer (RAB), in order to transmit the IP packet, the RAB must be activated. Therefore, the IP mobility managing unit 13 requests the RAB to be reset in order to activate the RAB for the transmission of the generated IP packet (S130).

The packet mobility managing unit 16 performs a state transition procedure so that the connection state of the mobile terminal UE 10 to the mobile communication network is transited from the idle state to the active state through the mobility management protocol (S140).

At this time, the state transition procedure is performed in accordance with service request and subscriber authentication procedures in the mobility management protocol of the packet mobility managing unit 16 and the radio connection setup of the radio resource controller 17.

When the mobile terminal UE 10 is activated for the mobile communication network (S150), the IP mobility managing unit 13 transmits the IP packet through the reset RAB and requests the EPC 40 to update IP addresses. At this time, the EPC 40 registers the updated IP addresses to complete an IP mobility management procedure (S160).

When the IP mobility management procedure is completed, the packet service performed by the WLAN 20 is continuously provided to the mobile terminal UE 10 through the EUTRAN 30 of the mobile communication network (S170).

The mobile terminal UE 10 is provided with a default bearer that does not guarantee QoS by the mobile communication network through basic IP connection setup. When high quality multimedia data whose QoS is to be guaranteed are transmitted, a dedicated bearer is additionally set in accordance with the request of the network (S180) and packet data are received through the set dedicated bearer (S190).

Figure 4:
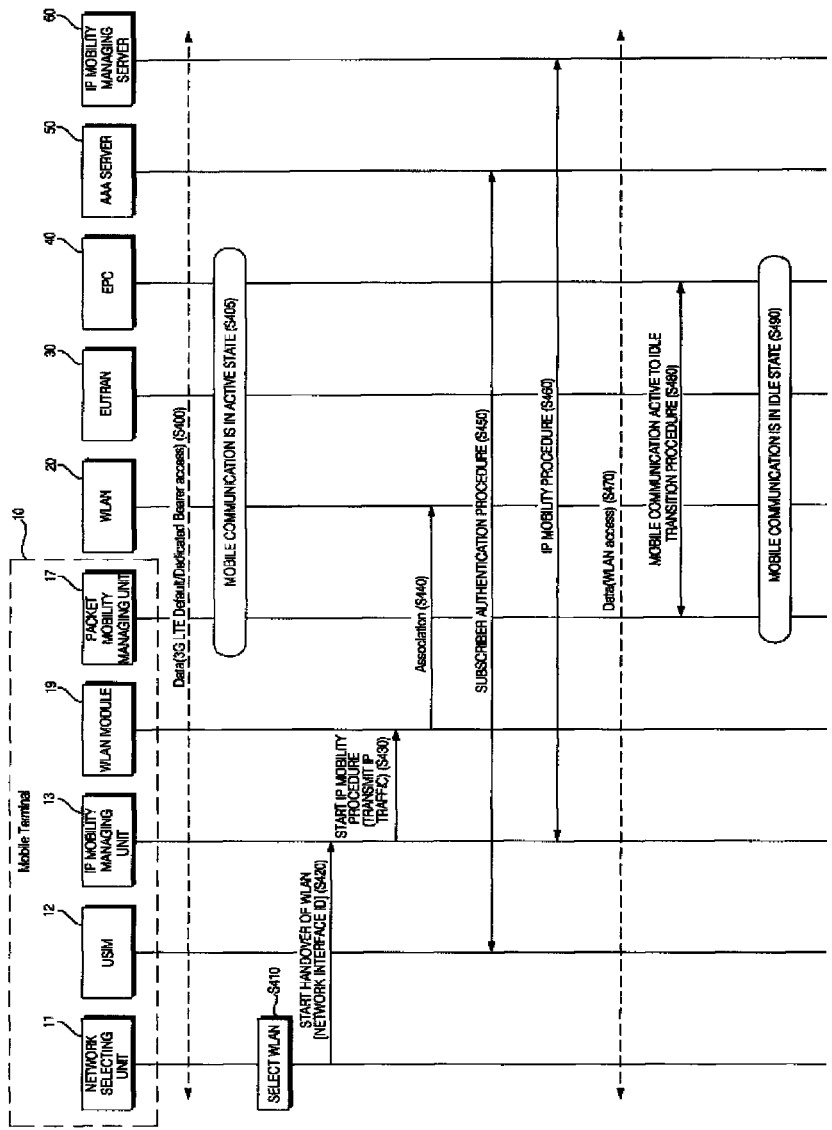
FIG. 4 is a flowchart illustrating the operations of a method of performing handover of the mobile terminal according to an embodiment of the present invention from a mobile communication network to a WLAN.

FIG. 4 is a flowchart illustrating the operations of a method of performing handover of the mobile terminal according to an embodiment of the present invention from a mobile communication network to a WLAN.

Referring to FIG. 4, at the moment when power is turned on so that the mobile terminal UE 10 is driven, the mobile terminal UE 10 is connected to the EUTRAN 30 to be registered in the mobile communication network and to use a packet service through the default bearer or the dedicated bearer (S400). At this time, the mobile terminal UE 10 is activated to be connected to the mobile communication network (S405).

As the mobile terminal UE 10 moves, when the mobile terminal UE 10 enters the coverage of the WLAN 20, the network selecting unit 11 searches a WLAN service set identifier (SSID) received by the WLAN module 19 in accordance with a subscriber policy to select one AP 21 of the WLAN 20 and to be connected to the AP 21 (S410).

The network selecting unit 11 transmits a network interface ID for the WLAN to the IP mobility managing unit 13 so that the handover to the WLAN is started (S420).

The IP mobility managing unit 13 generates an IP packet for performing the IP mobility procedure and transmits the generated IP packet to the WLAN module 19 (S430). The WLAN module 19 senses the IP packet to try connection to the AP 21 of the WLAN 20 selected by the network selecting unit 11. The WLAN module 19 is connected to the WLAN 20 through association to the WLAN 20 (S440).

Then, in accordance with the request of the EPC 40 of the mobile communication network, a WLAN subscriber authentication procedure is performed using authentication information and a code key between the USIM 12 and the AAA 50 (S450). When the WLAN subscriber authentication procedure is completed, the WLAN assigns a new IP address and the IP mobility managing unit 13 registers the updated IP to perform an IP mobility management procedure (S460).

When the IP mobility management procedure is completed, the packet service provided to the mobile terminal UE 10 through the EUTRAN 30 is continuously provided through the WLAN 20 (S470).

At this time, since no more data transmission is performed between the mobile terminal UE 10 and the mobile communication network, the connection state of the mobile communication network is transited from the active state to the idle state (S480 and S490).

Therefore, in the mobile terminal and the method of performing the handover, it is possible to be selectively connected to a plurality of accessible networks and the handover is performed between networks having different connection procedures. As a result, the mobile terminal can continuously use a service so that the convenience of a user in accordance with the use of a packet service is improved and that network utility in a densely populated area is increased.

As described above, the mobile terminal according to the present invention and the method of performing the handover have been described with reference to the embodiment shown in the drawings, these are merely illustrative, and those skilled in the art will understand that various modifications and equivalent other embodiments of the present invention are possible. Consequently, the true technical protective scope of the present invention must be determined based on the technical spirit of the appended claims.

INDUSTRIAL APPLICABILITY

According to the present invention, in the mobile terminal and the method of performing the handover, the mobile terminal is constituted so that the handover can be performed to the plurality of networks having different connection methods. Therefore, while the mobile terminal selectively uses the networks, the service used by the mobile terminal is continuously provided so that it is possible to disperse the connection of the mobile terminal to the plurality of networks and to effectively manage the networks.

The invention claimed is:

1. A method of performing handover of a mobile terminal, comprising:

in a state where a mobile terminal is connected to a first radio network, when a second radio network having a different connection procedure from a connection procedure of the first radio network and connected to an evolved packet core (EPC) of the first radio network is sensed, selecting the second radio network and starting handover to the second radio network using a second radio network interface ID for the second radio network;

generating an IP packet in accordance with the second radio network interface ID and performing an IP mobility procedure;

being connected to the second radio network to perform an association procedure through subscriber authentication, to request the second radio network to update IP addresses, and to register the updated IP addresses; and receiving packet data through the second radio network using the updated IP addresses, in a state where the mobile terminal is connected to the second radio network, starting handover to the first radio network through a first radio network interface ID for the first radio network, after starting handover to the first radio network, generating and transmitting an IP packet for performing a mobility procedure in accordance with the first radio network interface ID and requesting the first radio network to reset a radio access bearer (RAB);

transiting a connection state to the first radio network from an idle state to an active state; and requesting the first radio network to update IP addresses to register updated IP addresses and to receive packet data through the first radio network.

2. The method of claim 1, further comprising transiting a connection state to the first radio network from an active state to an idle state when packet data are received through the second radio network.

3. The method of claim 1, before starting handover to the first radio network, further comprising,
- in a state where the mobile terminal is connected to the second radio network, selecting the first radio network to correspond to a change in a signal magnitude of the second radio network before connection to the second radio network is canceled.

4. A mobile terminal, comprising:
- a first communication module connected to a first radio network;
- a second communication module connected to a second radio network having a different connection method from a connection method of the first radio network and connected to an EPC of the first radio network;
- a network selecting unit for selecting one of the first and second radio networks and starting handover from a currently connected network to the selected network using a network interface ID for the selected network; and
- an IP mobility managing unit for registering a new IP address received from the selected network to perform an IP mobility procedure and for allowing packet data to be received through the selected network,
- wherein the IP mobility managing unit performs a association procedure using a second radio network interface ID for the second radio network when handover is performed from the first radio network to the second radio network, and requests to reset a RAB using a first radio network interface ID for the first radio network when handover is performed from the second radio network to the first radio network.

5. The mobile terminal of claim 4, further comprising a packet mobility managing unit for transiting a state of the first radio network,
- wherein the packet mobility managing unit has connection of the mobile terminal to the first radio network transited to an idle state when handover is performed from the first radio network to the second radio network, and has connection to the first radio network transited from an idle state to an active state to correspond to request of resetting the RAB of the IP mobility managing unit when handover is performed from the second radio network to the first radio network.

6. The mobile terminal of claim 5, wherein, when the connection of the mobile terminal to the first radio network is transited to the active state by the packet mobility managing unit, the IP mobility managing unit transmits the generated IP packet through the reset RAB and updates and registers the IP address for the mobile terminal.

* * * * *